US009031967B2

(12) United States Patent
Swinson et al.

(10) Patent No.: US 9,031,967 B2
(45) Date of Patent: May 12, 2015

(54) NATURAL LANGUAGE PROCESSING SYSTEM, METHOD AND COMPUTER PROGRAM PRODUCT USEFUL FOR AUTOMOTIVE DATA MAPPING

(75) Inventors: Michael Swinson, Santa Monica, CA (US); Mikhail Semeniuk, Golden Valley, MN (US); Xingchu Liu, Los Angeles, CA (US)

(73) Assignee: TrueCar, Inc., Santa Monica, CA (US)

( * ) Notice: Subject to any disclaimer, the term of this patent is extended or adjusted under 35 U.S.C. 154(b) by 0 days.

(21) Appl. No.: 13/406,325

(22) Filed: Feb. 27, 2012

(65) Prior Publication Data
US 2013/0226945 A1   Aug. 29, 2013

(51) Int. Cl.
G06F 17/30 (2006.01)
G06Q 30/02 (2012.01)
G06F 17/27 (2006.01)

(52) U.S. Cl.
CPC .... *G06F 17/30985* (2013.01); *G06F 17/30684* (2013.01); *G06Q 30/0283* (2013.01); *G06F 17/2795* (2013.01)

(58) Field of Classification Search
None
See application file for complete search history.

(56) References Cited

U.S. PATENT DOCUMENTS

| | | | | |
|---|---|---|---|---|
| 2006/0136455 A1* | 6/2006 | Wen et al. | | 707/101 |
| 2006/0212441 A1* | 9/2006 | Tang et al. | | 707/5 |
| 2008/0027882 A1* | 1/2008 | Allen et al. | | 705/400 |
| 2008/0126303 A1* | 5/2008 | Park et al. | | 707/3 |
| 2009/0187513 A1* | 7/2009 | Noy et al. | | 705/400 |
| 2009/0210418 A1* | 8/2009 | Arasu et al. | | 707/6 |
| 2009/0313463 A1* | 12/2009 | Pang et al. | | 713/150 |
| 2010/0198821 A1* | 8/2010 | Loritz et al. | | 707/728 |
| 2011/0106821 A1* | 5/2011 | Hassanzadeh et al. | | 707/749 |
| 2011/0264595 A1* | 10/2011 | Anspach et al. | | 705/306 |
| 2011/0289026 A1* | 11/2011 | Kannan et al. | | 706/12 |
| 2013/0006610 A1* | 1/2013 | Quadracci et al. | | 704/9 |

OTHER PUBLICATIONS

Dale et al; Handbook of Natural Language Processing; 2000; Marcel Dekker; pp. iii and 462.*
Piotrowski, Michael; Natural Language Processing for Historical Texts; 2012; Morgan & Claypool; pp. 71 and 78.*
McCarthy et al; Applied Natural Language Processing; Oct. 31, 2011; IGI Global; Chapters 18 and 26.*

(Continued)

*Primary Examiner* — Tony Mahmoudi
*Assistant Examiner* — Umar Mian
(74) *Attorney, Agent, or Firm* — Sprinkle IP Law Group

(57) ABSTRACT

Natural language processing (NLP) approaches may be utilized to map two strings. The strings may come from sources utilizing different naming conventions. One example may be a data aggregator that collects used car transaction information. Another example may be a comprehensive database listing all possible manufacturer-defined vehicle options. A NLP system may operate to determine whether a source string is present in a target string and outputting a match containing the source string and the target string if the source string is present in the target string or computing a similarity factor if the source string is not present in the target string. The similarity factor representing a measure of similarity between two strings may be computed based on a plurality of parameters, including a Levenshtein edit distance parameter. The computed similarity can be used to find pricing information, including trade-in, sale, and list prices, across disparate naming conventions.

18 Claims, 8 Drawing Sheets

(56) References Cited

OTHER PUBLICATIONS

Marzal et al.; "Computation of Normalized Edit Distance and Applications"; Sep. 1993; IEEE Transactions on Pattern Analysis and Machine Intelligence, vol. 15, No. 9; pp. 926-932.*

Ehrig et al.; "Similarity for Ontologies —a Comprehensive Framework"; Workshop Enterprise Modelling and Ontology: Ingredients for Interoperability, at PAKM; 2004.*

* cited by examiner

NATURAL LANGUAGE PROCESSING SYSTEM, METHOD AND COMPUTER PROGRAM PRODUCT USEFUL FOR AUTOMOTIVE DATA MAPPING

TECHNICAL FIELD

Embodiments disclosed herein relate generally to data analysis and, more particularly, to analyzing, comparing and mapping automotive data utilizing natural language processing approaches.

BACKGROUND OF THE RELATED ART

Naming conventions are schemes for classifying and/or naming objects. Naming conventions utilize a set of rules for choosing character strings identifying variables, types, options, functions and the like. Standardized naming conventions allow useful information to be more efficiently deduced from the names based on regularities.

Yet, within the same field or industry different naming conventions may be used by various entities to describe the same product and/or product features. While this may not be an issue for some industries, it can cause significant challenges in certain industries when trying to understand and/or make use of data from various sources employing disparate naming conventions for the same product and/or product features.

In the automotive industry, for example, definitions of the vehicle year, make, and model have not been standardized at least in the United States. The automotive industry data is scattered across countries and even continents with hundreds of data providers, many of which have their own definitions of vehicles, as well as styles and/or options that apply to the vehicles—the way data providers define a model, a trim or a style can vary greatly from one data provider to another. Currently, there is no one source of standardized naming conventions for vehicles. Additionally, there is a lack of standardized definitions of vehicle attributes and options, especially for vehicles that are not sold as new.

SUMMARY OF THE DISCLOSURE

Embodiments disclosed herein can address the aforementioned significant challenges in trying to understand and/or make use of data from disparate data sources. For example, utilizing natural language processing (NLP) approaches, embodiments disclosed herein can analyze, compare, and map automotive data with disparate naming conventions for the same trim and/or options features.

In some embodiments, the NLP approaches may be utilized to map a source string and a target string. The source and target strings may come from data providers or sources utilizing different naming conventions. One example of a data provider may collect used car transaction information from auctions, dealers, online listings, etc. Another example data provider may provide a comprehensive database listing a variety of vehicles with manufacturer-defined vehicle options.

In some embodiments, a NLP system implementing the NLP approaches may operate to determine whether a source string is present in a target string. In one embodiment, the NLP system may first determine if a base term that matches the source string is present in a lexicon, utilize the base term to create a set of strings that includes one or more terms in the lexicon, and compare each string in the set of strings with the target string. If a match is found, the NLP system outputs the matching pair of strings with corresponding identifiers, their match style, and match confidence. If no match is found, the NLP system may proceed to compute a similarity factor for each target string. This produces a similarity factor for each possible string match, from which the NLP system may select one that has the highest value and output the matching pair.

The similarity factor representing a measure of similarity between two strings may be computed based on a plurality of parameters, including a Levenshtein edit distance parameter. The computed similarity can be used to match different data sources in order to find pricing information, including trade-in, sale, and list prices.

Embodiments described herein can be implemented in the form of control logic in software or hardware or a combination of both. The control logic may be embodied in a computer program product comprising at least one non-transitory computer readable medium storing instructions translatable by a server computer to perform essentially the NLP methodology disclosed herein.

Numerous other alternative embodiments are also possible.

Embodiments disclosed herein may provide many advantages. For example, embodiments disclosed herein can intelligently evaluate the similarity of new terms and optimize any matches across disparate naming conventions. The knowledge, experience, and learning information can be accumulated to further enhance the overall system performance, including the ability to generate a used car pricing report with a high degree of certainty on pricing information presented on-the-fly to an end user.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
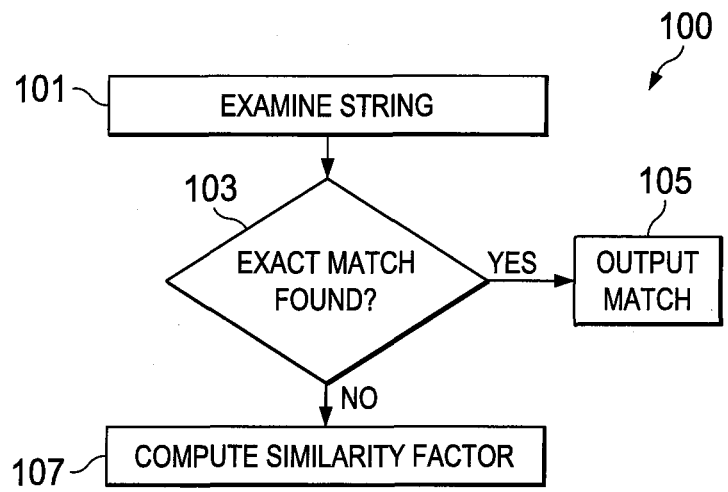
FIG. 1 depicts a flow diagram illustrating an example of one embodiment of a data mapping method.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As discussed above, significant challenges exist in certain industries in processing as well as utilizing data from various sources employing disparate naming conventions, definitions or lexicons describing the same product/service or related products/services. For example, in the automotive industry, Data Provider (A) may maintain a database of vehicles and their manufacturer pricing, and Data Provider (B) may maintain a database of vehicles and their residual values. However, these providers do not use (and they are not required to use) the same naming convention when describing the Year, Make, Model, Style of the same vehicle. Thus, in the database of data Provider (A), a particular vehicle may be described as "2008 BMW 335i Auto" and the same vehicle in the database of Data Provider (B) may be described as "2008 BMW 335i w/Automatic Transmission."

As this example demonstrates, inconsistent definitions of vehicles and their attributes and options remain a major hurdle to obtaining a comprehensive picture to automotive industry. The inconsistency in automotive data can be even more prevalent for vehicles that are sold and/or resold by private, individual sellers.

This disclosure presents a set of methodologies to close the gap among data providers and match text strings from different sources into a standard set. To match text strings from different sources into a standard set, embodiments of a system implementing a unique matching algorithm may utilize particular approaches of Natural Language Processing (NLP).

A first NLP approach relates to finding exact matches from a lexicon database. A lexicon database can be used to map similarly described and/or sounding character strings from separate, different or unique sources to determine if these character strings represent the same object, option or entity. In one embodiment, a lexicon database can be a database storing terms that are classified to mean the same thing. Below is an example of what a lexicon database may contain:

Base Term: a string that can also be found in a standardized database—this can be referred to as a target string.

Term Sub-Category: a generalized way of describing the Base Term.

Term Category: a global category of the Sub-Category.

Term Weight: a factor that describes the complexity of the term. For example, highly complicated terms can have weights of 1; whereas, simple terms can have a weight of less than 1.

Term Type: noun, adjective, verb, etc.

If an exact match does not exist in the lexicon database, a second approach may be utilized. The second NLP approach relates to computing a similarity factor (SF) based on a plurality of sub-factors. Example sub-factors can include the following:

The Levenshtein edit distance

Single-word matches

Multi-word matches

Exact-Term match

These example sub-factors will be explained further below. In one embodiment, the similarity factor is computed as a sum of weighted combination of sub-factors listed above. Additional factors can be computed and specified by the user.

Utilizing these approaches, the NLP methodology presents a framework which not only establishes a repository accumulating knowledge, experience, and learning, but also can intelligently evaluate the similarity of new terms and optimize the matches. An object of the NLP system and method described herein is to identify similarly described and sounding strings and decide, through a series of computational steps, whether or not the two strings are referring to the same object. Embodiments exemplifying how this object can be achieved will now be described in detail.

In some embodiments, a lexicon is not required to implement the NLP methodology disclosed herein. FIG. 1 depicts a flow diagram illustrating an example of one embodiment of a data mapping method utilizing a NLP methodology. In the example of FIG. 1, method 100 may comprise, at a computer running an NLP module implementing method 100, examining a source string (step 101), and determining whether the source string is present in a target string (step 103). This computer can be a server computer in a network environment. An example of a suitable network environment is described below with reference to FIG. 5. The source string can be from a first source communicatively connected to the server computer over a first network connection. The target string can be from a second source communicatively connected to the server computer over a second network connection. The first source and the second source may be two different data providers to a vehicle data system exemplified in FIG. 5. As a non-limiting example, these data providers may collect various types of automotive data and employ different naming conventions for storing the collected data.

In the example shown in FIG. 1, method 100 may further comprise, if the source string is present in the target string, outputting a match containing the source string and the target string (step 105) and, if the source string is not present in the target string, computing a similarity factor for the source string (step 107). The computation for the similarity factor may be based at least on a set of parameters which will be further described below.

Figure 2:
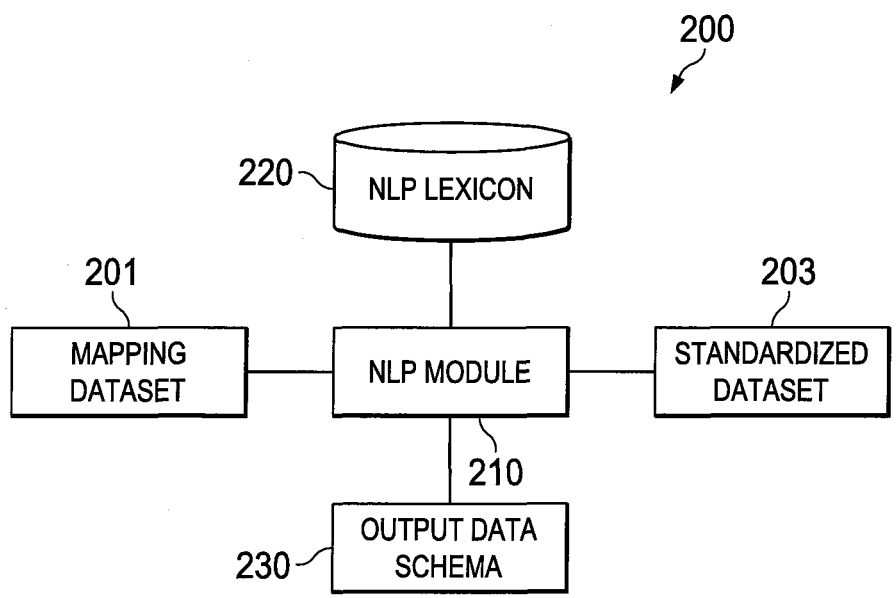
FIG. 2 depicts a diagrammatic representation of an example of one embodiment of a data mapping system implementing a natural language processing (NLP) methodology.

In the above example, both the source string and the target string may be input strings obtained or otherwise received at an NLP system, an example of which is illustrated in FIG. 2.

In the example of FIG. 2, NLP system 200 may comprise NLP module 210, NLP lexicon 220, and output data schema 230. NLP lexicon 220 may contain base terms and groupings of the terms—terms identified as having the same meaning are grouped in a sub-category. For example, terms 'Nav System', 'Navigation System w/Tech Pkg.' and 'Navigation System' are in the same sub-category group called 'Navigation System'.

NLP module 210 may be communicatively connected to mapping dataset 201 and standardized dataset 203. Mapping dataset 201 may contain terms to be mapped. Standardized dataset 203 can be the target dataset to map to (i.e., it is the "source of truth" in the sense that standardized dataset 203 may be a source of a set of base terms in NLP lexicon 220). In one embodiment, output data schema 230 can be an empty contain base terms, term sub-category, term category, term weight, and term type. Additionally, the NLP lexicon may include database related fields. Example fields may include an identifier (ID), primary key, date added, date updated, and the person responsible for adding and updating the NLP lexicon.

As an example, the NLP lexicon can initially be built manually by gathering vehicles, attributes and options descriptions and terms and grouping them into term sub-categories and term categories that made sense for a particular application. For example, to map automotive data, an NLP lexicon may be built from an automotive industry perspective, an example of which is illustrated in Table 1 below.

TABLE 1

| ID | BASE TERM | SUBCATEGORY | CATEGORY | TERM WEIGHT | TERM TYPE | DATE ADDED |
|----|-----------|-------------|----------|-------------|-----------|------------|
| 75 | autotran | Automatic transmission | TRANSMISSION | 0.50 | noun | 31 Jul. 2011 23:43:33 |
| 76 | auto transmission | Automatic transmission | TRANSMISSION | 1.00 | noun | 31 Jul. 2011 23:43:33 |
| 77 | w/o at - exc diesel | Automatic transmission | TRANSMISSION | 1.00 | noun | 31 Jul. 2011 23:43:33 |
| 78 | automatic transmission | Automatic transmission | TRANSMISSION | 1.00 | noun | 31 Jul. 2011 23:43:33 |
| 79 | w/o auto trans v6 | Automatic transmission | TRANSMISSION | 1.00 | noun | 31 Jul. 2011 23:43:33 |
| 80 | Automatic transmission | Automatic transmission | TRANSMISSION | 1.00 | noun | 31 Jul. 2011 23:43:33 |
| 81 | automatic trans | Automatic transmission | TRANSMISSION | 1.00 | noun | 31 Jul. 2011 23:43:33 |
| 83 | a/t | Automatic transmission | TRANSMISSION | 0.33 | noun | 31 Jul. 2011 23:43:33 |
| 84 | auto trans | Automatic transmission | TRANSMISSION | 0.50 | noun | 31 Jul. 2011 23:43:33 |
| 85 | 5-speed sequential trans | Automatic transmission | TRANSMISSION | 0.50 | noun | 31 Jul. 2011 23:43:33 |
| 86 | continuously variable | Automatic transmission | TRANSMISSION | 0.11 | noun | 31 Jul. 2011 23:43:33 |
| 87 | 5-speed auto | Automatic transmission | TRANSMISSION | 1.00 | noun | 31 Jul. 2011 23:43:33 |
| 89 | 5-speed automatic transmission | Automatic transmission | TRANSMISSION | 1.00 | noun | 31 Jul. 2011 23:43:33 |
| 90 | 6-speed auto | Automatic transmission | TRANSMISSION | 1.00 | noun | 31 Jul. 2011 23:43:33 |
| 91 | 6-speed automatic transmission | Automatic transmission | TRANSMISSION | 1.00 | noun | 31 Jul. 2011 23:43:33 |
| 92 | 5 speed auto | Automatic transmission | TRANSMISSION | 1.00 | noun | 31 Jul. 2011 23:43:33 |
| 94 | 5 speed automatic transmission | Automatic transmission | TRANSMISSION | 1.00 | noun | 31 Jul. 2011 23:43:33 |
| 95 | 6 speed auto | Automatic transmission | TRANSMISSION | 1.00 | noun | 31 Jul. 2011 23:43:33 |
| 96 | 6 speed automatic transmission | Automatic transmission | TRANSMISSION | 1.00 | noun | 31 Jul. 2011 23:43:33 | table or dataset for storing mapping results. In one embodiment, NLP system 200 may further comprise a server computer having necessary hardware and/or software to run NLP module 210. In one embodiment, NLP module 210 may comprise source code that utilizes components of NLP system 200 to run an NLP matching algorithm. In one embodiment, NLP lexicon 220 may be implemented via a database accessible by the server computer.

In one embodiment, an NLP lexicon can be a proprietary database of base terms that are grouped and sub-grouped based on contextual and logical similarity, with assigned complexity weights for choosing between multiple matches when they happen. As mentioned above, the lexicon can New terms can be added into the lexicon either by individuals who work on mapping projects or by the string matches having a high similarity factor from the second NLP approach mentioned above. The lexicon can be a fast growing database, with alterations happening to meet project specific criteria. Taking this fast growth into consideration, in one embodiment, the lexicon can be implemented to be under source control. This allows users to check out previous versions of the database and ensures that results can be replicated and tracked as users upgrade to newer versions of the database. Local versions of the database are allowed, and individual users can maintain and modify their own copies, and changes can be reconciled into future releases of the database.

For example, a team or group of people at an organization may be tasked to incorporate individual changes into a master version of the lexicon.

In one embodiment, the lexicon is stored at a source repository communicatively connected to a plurality of users in the organization. The latest copy of the lexicon can be checked out from this source repository.

As discussed before, when an exact match cannot be extracted from an NLP Lexicon, a similarity factor (SF) is computed according to the second NLP approach. In one embodiment, SF is computed based on the following sets of parameters:

Base Set: this refers to a first set of parameters used by an NLP system to determine SF.

User Defined Set: this refers to a second set of additional parameters and functions that can be defined by an NLP system administrator.

Below is an example of a Base Set:

The Levenshtein edit distance parameter:

$$\text{Levenshtein edit distance parameter} = \left(\frac{\text{Levenshtein edit distance}}{\text{Characters in Source Data String}}\right)^{-1}$$

Single-word matches parameter:

$$\frac{\text{\# of Individual Words from Target String that Match Any Word in Source String}}{\text{\# of Total Words in Target String}}.$$

Multi-word matches parameter:

$$\frac{(\text{\# of Consecutive Words from Target String that Match Any Consecutive Word in Source String}) * 2}{\text{\# of Total Words in Target String}}$$

Exact-term match parameter: If the source string is fully present in the target string then this parameter takes the value of 1, otherwise 0.

The Levenshtein edit distance (or simply Levenshtein distance) refers to the edit distance between two strings of characters and can be used to measure the amount of difference between two sequences. The Levenshtein distance between two strings is defined as the minimum number of edits needed to transform one string into the other. The edit operations that are allowed are insertion, deletion, and substitution of a single character. For example, the Levenshtein distance between two strings "moon" and "noon" is 1, since it takes one edit to change "moon" to "noon" (by substituting "m" with "n") and there is no way to do so with fewer than one edit. The Levenshtein edit distance therefore can provide a measure of similarity between a source string ($S_i$) and a target string ($T_j$). In the example of FIG. 2, $S_i$ refers to a character string from mapping dataset 201 and $T_j$ refers to a character string from standardized dataset 203. The Levenshtein edit distance is known to those skilled in the art and thus is not further described herein. In one embodiment, the Levenshtein edit distance parameter can be calculated by determining the Levenshtein distance between two strings, normalizing the Levenshtein edit distance, and taking an inverse of the normalized Levenshtein edit distance. The Levenshtein edit distance can be normalized by the number of characters in a source string, including any space therein. The inverse of the normalized Levenshtein edit distance can be taken to penalize or otherwise account for higher numbers of transformations.

In one embodiment, single-word matches can be computed by scanning the source string, one word at a time, and checking to see if that word is present in the target string. If a given word is present, then the value of a "single-word matches" variable is increased by one. If that particular word is not present, it is not increased. The value of this variable is then divided by the total number of words in the target string to ensure that the count is not biased by the total number of words in the target string.

In one embodiment, multi-word matches can be computed by scanning the source string, two consecutive words at a time, and checking to see if the consecutive word combination is present in the target string. If a given word combination is present in the target string, then the value of a "multi-word matches" variable is increased by one. If that particular word combination is not present, it is not increased. The value of this variable is then divided by the total number of words in the target string to ensure that the count is not biased by the total number of words in the target string.

The User Defined Set: This set can include any user defined variables and/or functions. An example of a user defined set variable is the vehicle Manufacturer's Suggested Retail Price (MSRP). Suppose a given goal is to match vehicle descriptions from two data sources. They may have exactly (or close to) the same vehicle MSRPs, even though they may have different naming conventions. The user therefore can have an option to match on vehicle MSRP and apply a significant weight to matches based on this variable.

Those skilled in the art will appreciate that the above-described parameters are meant to be non-limiting examples and that additional parameters may be utilized. For example, in one embodiment, an NLP system may be implemented to utilize the following additional base set parameters:

Weighted Levenshtein Edit Distance: This parameter applies a weight (0 to 1) to substitutions based on keyboard key distance. For example, a substitution involving 'h' and 'j' may be weighted higher than a substitution involving 'h' and 'p' because 'h' and 'j' keys are next to each other on a standard U.S. keyboard while 'h' and 'p' keys are not as close on the same keyboard.

Reorganized String Match: This parameter takes a binary (0 or 1) result if the individual words of a source string can be restructured in a way to match a target string.

Additional parameters are also possible and anticipated.

Figure 3:
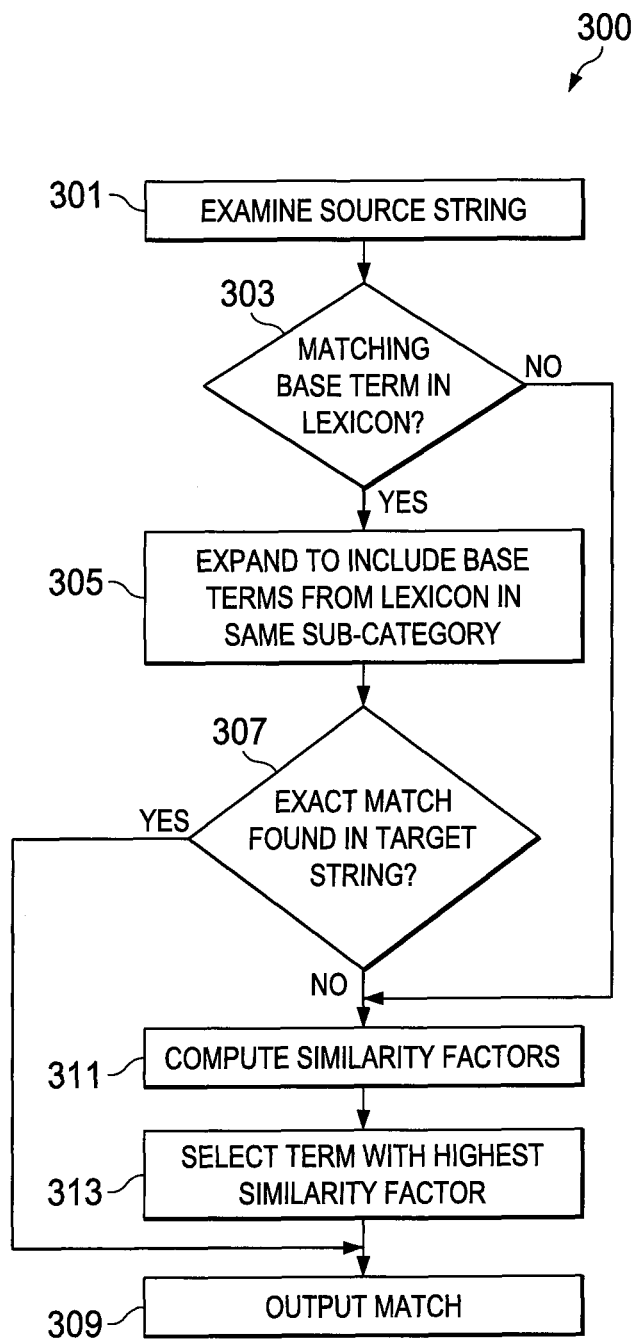
FIG. 3 depicts a flow diagram illustrating an example of one embodiment of a data mapping method utilizing a lexicon.

FIG. 3 depicts a flow diagram illustrating an example of one embodiment of a data mapping method. In one embodiment, an NLP system implementing method 300 may operate to examine a source string (step 301) and may check to see if a base term that matches the source string is present in a designated lexicon (step 303). The source string can come from a first data source or provider. Method 300 may further comprise, if there is a base term in the lexicon that matches the source string ("matching base term"), creating an expanded set of strings that includes the matching base term as well as any additional base terms in the lexicon that belong to the same group or sub-category as the matching base term (step 305). Method 300 may further comprise checking to see if any of the base terms in this expanded set of strings is present in a target string (step 307) and, if a match is found, outputting the match containing the source and target strings (step 309). The target string can come from a second data source or provider that is the same as or different from the first data source or provider. If there is not a matching base term in the lexicon, method 300 may proceed to computing a similarity factor to measure a level of similarity between the source string and each possible target string (step 311). Likewise, if a matching base term is present in the lexicon but an exact match cannot be found in the target string, method 300 may proceed to computing a similarity factor to measure a level of similarity between each base term in the expanded set of strings (including the source string) and each possible target string. The pair of terms with the highest similarity factor is then selected (step 313) for output (step 309).

One embodiment of a data mapping method utilizing sample input strings from two different data sources shown in FIG. 4 will now be described. Although automotive data samples are used in some example embodiments disclosed herein, those skilled in the art will appreciate that the invention disclosed herein can be readily implemented for other types of data across various industries.

Figure 4:
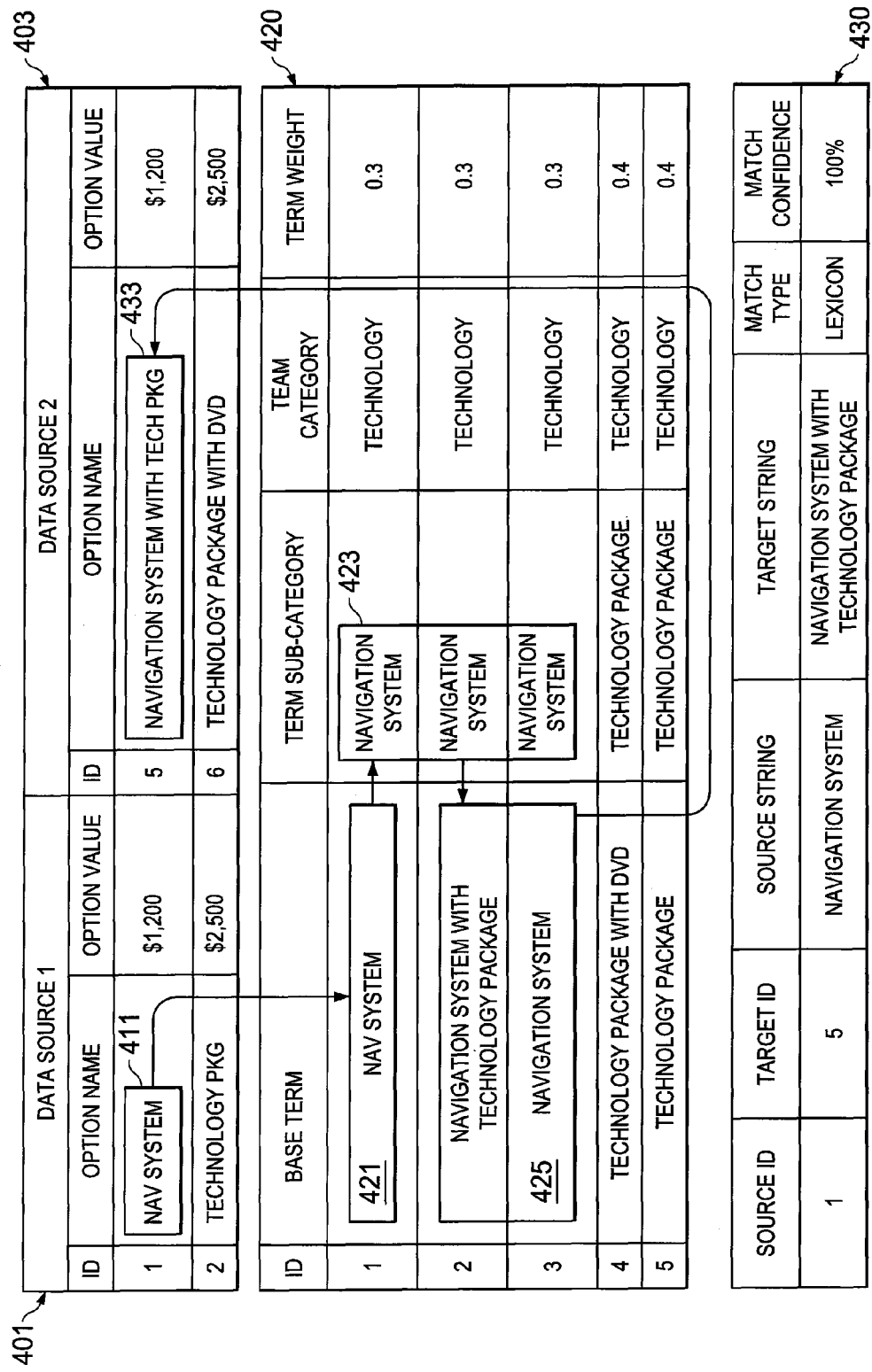
FIG. 4 depicts by example how one embodiment of an NLP system implementing the NLP methodology may map input strings from disparate sources utilizing a lexicon.

In the example of FIG. 4, mapping dataset 401 is from Data Source 1 and standardized dataset 403 is from Data Source 2. In this case, base term 421 Nav System in lexicon 420 matches source string 411 'Nay System'. The NLP system adds base terms 425 to a set with base term 421 since base terms 421 and 425 are in the same term sub-category 423 in lexicon 420. As illustrated in FIG. 4, the NLP system can compare each of the term sub-category strings in lexicon 420 against target string 433 from Data Source 2. In this case, the NLP system detects that 'Navigation System w/Tech Pkg.' is an exact match, terminates the process, and output the match. Example output 430 may include a source identifier, a target identifier, the matching source and target strings, their match type, and a match confidence which, in this case, is 100% for an exact match.

Using the same sample data, below illustrates how the NLP system will behave when trying to map 'Technology pkg' option from Data Source 1. As described above, the NLP system will first check to see if the Option Name of interest (a source string) is present in the Lexicon. In this case, no match is found in the lexicon. The NLP system may proceed to compute the similarity factor (SF), comparing the Option Name (i.e., the source string) from Data Source 1 to all possible terms (i.e., the target strings) in Data Source 2 (step 311).

In one embodiment, SF can be defined as follows:
$SF = \sum_{i=1}^{n} \beta_i * \omega_i + \sum_{j=1}^{m} \alpha_j * \phi_j$ where n, m represent the total number of words in a target string, β represents a Base Set variable, ω represents a configurable weight for the Base Set variable, a represents a User Defined Set variable, φ represents a configurable weight for the User Defined Set variable, and i and j represent the individual terms that are part of the Base and User Defined Sets.

Following the above example, computing the similarity factor when mapping 'Technology pkg' to 'Navigation System w/Tech Pkg.' results in.
  The Levenshtein edit distance parameter: $=(24/14)^{-1}=$ 0.583
  Single-word matches parameter: 1 (Only 'pkg' matches)/4=0.25
  Multi-word matches parameter: 0
  Exact-Term match parameter: 0
  Given equal weights for this example (and assuming no User Defined variables), the Similarity Factor is computed as:

$SF = \Sigma 0.583*0.25 + 0.25*0.25 + 0*0.25 + 0*0.25 = 0.2$

Computing the similarity factor when mapping 'Technology pkg' to 'Technology pkg with DVD' results in:
  The Levenshtein edit distance parameter: $=(9/14)^{-1}=1.5$
  Single-word matches parameter: 2 ('Technology' and 'pkg' matches)/4=0.5
  Multi-word matches parameter: 1 ('Technology pkg')/4=0.25
  Exact-Term match parameter: 1
  Again, given equal weights and assuming no User Defined variables, the Similarity Factor is computed as:

$SF_2 = \Sigma 1.5*0.25 + 0.5*0.25 + 0.25*0.25 + 1*0.25 = 0.8125$

The NLP system then compares the similarity factor for both possible matches, determines that the second term 'Technology pkg with DVD' has the highest likelihood of matching 'Technology pkg' (step 313), and outputs the match accordingly (step 309), as illustrated in Table 2 below.

TABLE 2

| Source ID | Target ID | Source String | Target String | Match Type | Match Confidence |
|---|---|---|---|---|---|
| 2 | 6 | Technology pkg | Technology pkg with DVD' | Similarity Factor | 81.25% |

Additionally, because 'Technology pkg with DVD' (the target string) is found in the lexicon, the NLP system may recommend that 'Technology pkg' (the source string) be added to the lexicon and classified into the 'Technology Package' category.

Figure 10:
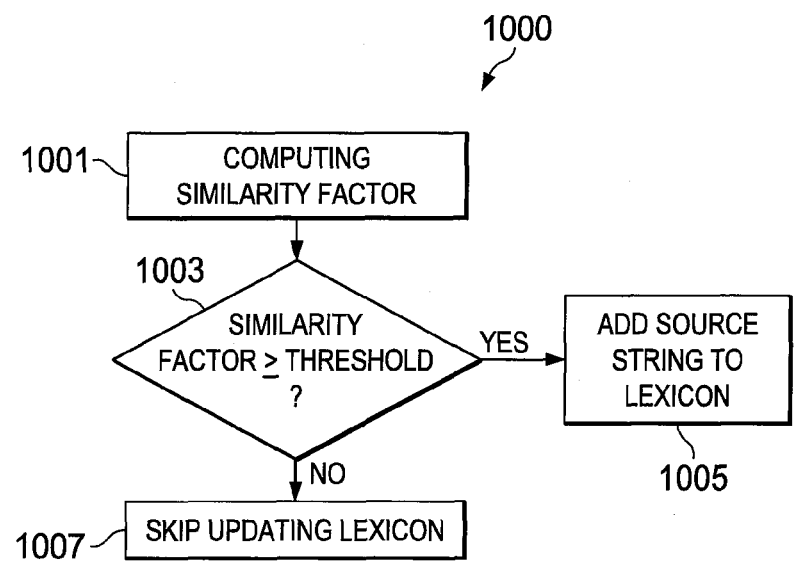
FIG. 10 depicts a flow diagram illustrating one example embodiment of a method of updating a lexicon.

In one embodiment, the recommendation or determination that a certain term or source string be added to the lexicon may be made if the similarity factor thus calculated is not smaller than a predetermined threshold. FIG. 10 depicts a flow diagram illustrating one example embodiment of a method of updating a lexicon. Method 1000 may comprise computing a similarity factor that provides a measure of similarity between a source string and a target string (step 1001) and comparing the computed similarity factor with a predetermined threshold (step 1003). In one embodiment, method 1000 may take place subsequent to outputting a pair of matching source and target strings (and hence the similarity factor would have already been computed). If the similarity factor is equal to or greater than the predetermined threshold, the source string is added to the lexicon (step 1005). Otherwise, the lexicon is not updated (step 1007). Following the above example, suppose the threshold is 0.8. Since $SF_2$ is 0.8125 and since 'Technology pkg with DVD' (the target string in this example) is in lexicon 420, the NLP system may recommend adding 'Technology pkg' (the source string in this example) to lexicon 420 by, in one embodiment, placing it on a list for review to be added to lexicon 420. In one embodiment, the NLP system may be programmed to automatically update a lexicon if a computed similarity factor associated with a new term is not smaller than a predetermined threshold. This allows the lexicon to grow and evolve overtime.

As discussed above, in some embodiments, the lexicon may not be utilized by the NLP system. In some embodiments, the NLP system may rely solely on the similarity factor to find a probable match. For example, in some cases, even though a match can be found in the lexicon, there may be no match in the standardized dataset (i.e., no targeting string can be found to match the source string). Further, in some cases, there may not be any entries in the lexicon to help with the matching process. Below provides an example of utilizing similarity factors to match vehicle data from different data sources. Table 3 shows sample data from Data Source 1 and Data Source 2.

TABLE 3

| Data Source 1 | | | | | Data Source 2 | | | | |
|---|---|---|---|---|---|---|---|---|---|
| ID | Year | Make | Model | Style | ID | Year | Make | Model | Style |
| 1 | 2008 | BMW | 3-Series | 335i Auto | 5 | 2008 | BMW | 3-Series | 335i Automatic |
| 2 | 2009 | BMW | 3-Series | 335i Auto | 6 | 2008 | BMW | 3-Series | 328i Automatic |

In this example, input data '2008 BMW 3-Series 335i Auto' from Data Source 1 is to be mapped to its appropriate counterpart in Data Source 2. However, there are no entries in the lexicon to help with this matching process. Thus, the underlying NLP system has to rely solely on similarity factors in finding a potential match in Data Source 2. Given that there is a 100% match between the Year, Make, and the Model of the vehicle, the NLP system in this example can focus on properly matching the Style (i.e., '335i Auto' in Data Source 1 and '335i Automatic' in Data Source 2).

Computing the similarity factor when mapping '335i Auto' to '335i Automatic' results in:
The Levenshtein edit distance parameter: $=(5/9)^{-1}=1.8$
Single-word matches parameter: 2 ('335i' and 'Auto')/2=1
Multi-word matches parameter: 1 ('335i Auto')
Exact-Term match parameter: 1
Given equal weights for this example and assuming no User Defined variables, the Similarity Factor is computed as:

$$SF_1 = \Sigma 1.8*0.25 + 1*0.25 + 1*0.25 + 1*0.25 = 1.2$$

Computing the similarity factor when mapping '335i Auto' to '328i Automatic' results in:
The Levenshtein edit distance parameter: $=(7/9)^{-1}=1.28$
Single-word matches parameter: 1 (Auto)/2=0.5
Multi-word matches parameter: 0
Exact-Term match parameter: 0
Again, given equal weights for this example and assuming no User Defined variables, the Similarity Factor is computed as:

$$SF_2 = \Sigma 1.28*0.25 + 0.5*0.25 + 0*0.25 + 0*0.25 = 0.445$$

The NLP system then compares the similarity factor for both possible matches, determines that the first term '335i Automatic' has the highest likelihood of matching the Style from Data Source 1 (step 313), and outputs the match accordingly (step 309), as illustrated in Table 4 below.

TABLE 4

| Source ID | Target ID | Source String | Target String | Match Type | Match Confidence |
|---|---|---|---|---|---|
| 1 | 5 | 335i Auto | 335i Automatic | Similarity Factor | 100% |

The above-described NLP methodology may find utility in many applications. For example, an NLP system implementing the NLP methodology disclosed herein may be configured to map manufacturer-defined vehicle options to trade-in residuals of those options. The NLP system can overcome the challenge in mapping the same options from very different data sources where disparate naming conventions are used.

Figure 5:
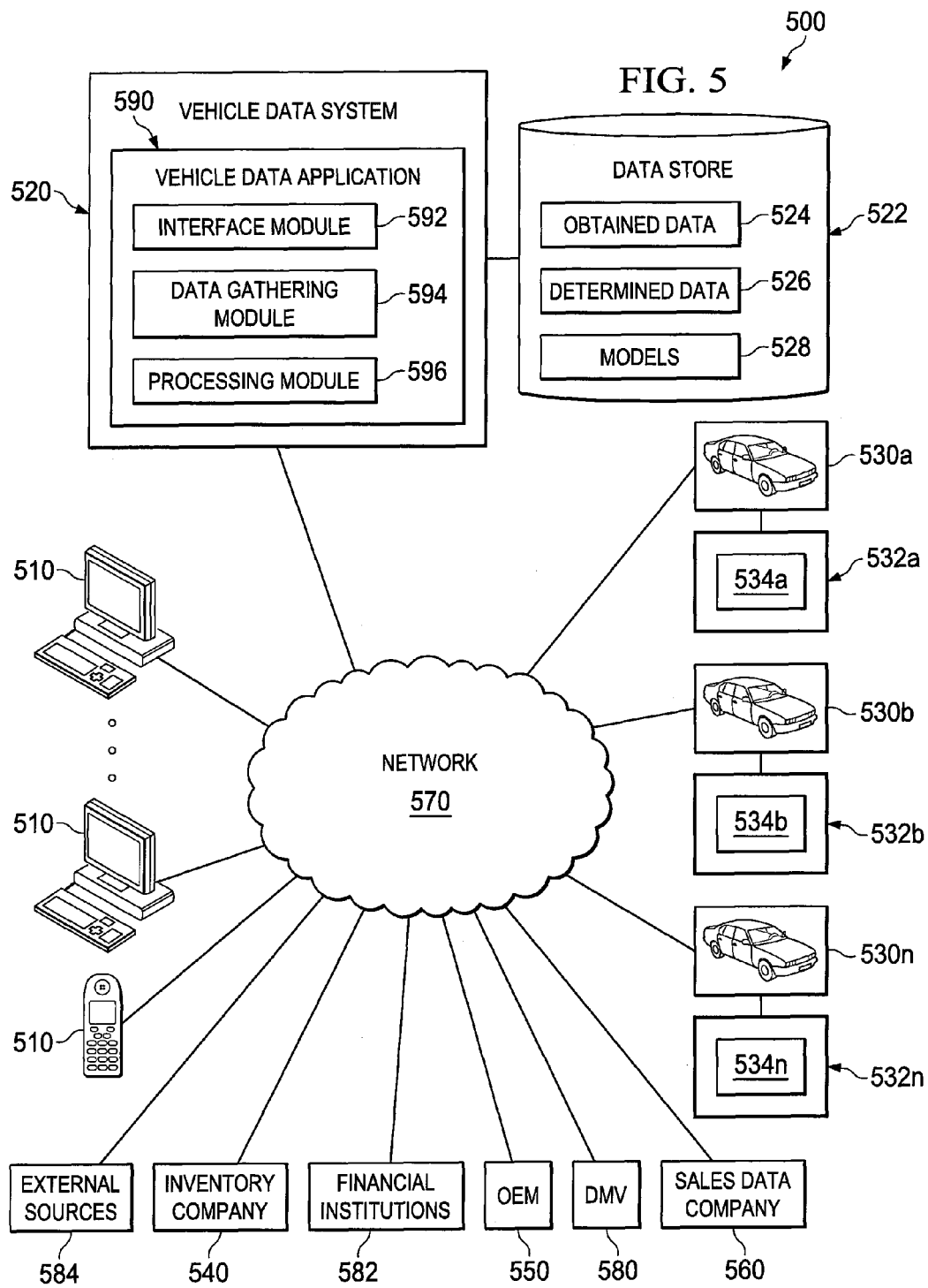
FIG. 5 depicts one embodiment of a topology including a vehicle data system communicatively connected to a plurality of data sources.

Embodiments of the systems and methods disclosed herein may be better explained with reference to FIG. 5 which depicts one embodiment of a topology which may be used to implement embodiments of the systems and methods disclosed herein. Topology 500 comprises a set of entities including vehicle data system 520 (also referred to herein as the TrueCar system) which is coupled through network 570 to computing devices 510 (e.g., computer systems, personal data assistants, kiosks, dedicated terminals, mobile telephones, smart phones, etc.), and one or more computing devices at inventory companies 540, original equipment manufacturers (OEM) 550, sales data companies 560, departments of motor vehicles (DMV) 580, financial institutions 582, external information sources 584, and one or more associated point of sale locations, in this embodiment car dealers 530a-n. Network 570 may be for example, a wireless or wireline communication network such as the Internet or wide area network (WAN), publicly switched telephone network (PTSN) or any other type of electronic or non-electronic communication link such as mail, courier services or the like.

Vehicle data system 520 may comprise one or more computer systems with central processing units executing instructions embodied on one or more computer readable media where the instructions are configured to perform at least some of the functionality associated with embodiments disclosed herein. These applications may include a vehicle data application 590 comprising one or more applications (instructions embodied on one or more non-transitory computer readable media) configured to implement an interface module 592, data gathering module 594 and processing module 596 utilized by the vehicle data system 520. Furthermore, vehicle data system 520 may include data store 522 operable to store obtained data 524, data 526 determined during operation, models 528 which may comprise a set of dealer cost model or price ratio models, or any other type of data associated with embodiments disclosed herein or determined during the implementation of those embodiments.

Vehicle data system 520 may provide a wide degree of functionality including utilizing one or more interfaces 592 configured to for example, receive and respond to queries from users at computing devices 510; interface with inventory companies 540, manufacturers 550, sales data companies 560, financial institutions 570, DMVs 580 or dealers 530 to obtain data; or provide data obtained, or determined, by vehicle data system 520 to any of inventory companies 540, manufacturers 550, sales data companies 560, financial institutions 582, DMVs 580, external data sources 584 or dealers 530. It will be understood that the particular interface 592 utilized in a given context may depend on the functionality being implemented by vehicle data system 520, the type of network 570 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 592 vehicle data system 520 may obtain data from a variety of sources, including one or more of inventory companies 540, manufacturers 550, sales data companies 560, financial institutions 582, DMVs 580, external data sources 584 or dealers 530 and store such data in data store 522. This data may be then grouped, analyzed or otherwise processed by vehicle data system 520 to determine desired data 526 or models 528 which are also stored in data store 522. An NLP system administrator at computing device 510 may access the vehicle data system 520 through the provided interfaces 592 and specify certain parameters, such as a desired vehicle configuration or incentive data the user wishes to apply, if any. Vehicle data system 120 can select a particular set of data in data store 522 based on the user specified parameters, process the set of data using processing module 596 and models 528, generate interfaces using interface module 592 using the selected data set and data determined from the processing, and present these interfaces to the user at the user's computing device 510. More specifically, in one embodiment, interfaces 592 may visually present the selected data set to the user in a highly intuitive and useful manner.

In particular, in one embodiment, a visual interface may present at least a portion of the selected data set as a price curve, bar chart, histogram, etc. that reflects quantifiable prices or price ranges (e.g., "average," "good," "great," "over-priced," etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the user's understanding of the presented data, the interface may also present data related to incentives which were utilized to determine the presented data or how such incentives were applied to determine presented data.

Turning to the various other entities in topology 500, dealer 530 may be a retail outlet for vehicles manufactured by one or more of OEMs 550. To track or otherwise manage sales, finance, parts, service, inventory and back office administration needs, dealers 530 may employ a dealer management system (DMS) 532. Since many DMS 532 are Active Server Pages (ASP) based, transaction data 534 may be obtained directly from the DMS 132 with a "key" (for example, an ID and Password with set permissions within the DMS system 532) that enables data to be retrieved from the DMS system 532. Many dealers 530 may also have one or more web sites which may be accessed over network 570, where pricing data pertinent to dealer 530 may be presented on those web sites, including any pre-determined, or upfront, pricing. This price is typically the "no haggle" price (i.e., price with no negotiation) and may be deemed a "fair" price by vehicle data system 520.

Inventory companies 540 may be one or more inventory polling companies, inventory management companies or listing aggregators which may obtain and store inventory data from one or more of dealers 530 (for example, obtaining such data from DMS 532). Inventory polling companies are typically commissioned by the dealer to pull data from a DMS 532 and format the data for use on web sites and by other systems. Inventory management companies manually upload inventory information (photos, description, specifications) on behalf of the dealer. Listing aggregators get their data by "scraping" or "spidering" web sites that display inventory content and receiving direct feeds from listing web sites (for example, AutoTrader.com, FordVehicles.com, etc.).

DMVs 580 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 582 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 560 may include any entities that collect any type of vehicle sales data. For example, syndicated sales data companies aggregate new and used sales transaction data from the DMS 532 systems of particular dealers 530. These companies may have formal agreements with dealers 530 that enable them to retrieve data from the dealer 530 in order to syndicate the collected data for the purposes of internal analysis or external purchase of the data by other data companies, dealers, and OEMs.

Manufacturers 550 are those entities which actually build the vehicles sold by dealers 530. In order to guide the pricing of their vehicles, the manufacturers 550 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 584 may comprise any number of other various source, online or otherwise, which may provide other types of desired data, for example data regarding vehicles, pricing, demographics, economic conditions, markets, locale(s), consumers, etc.

It should be noted here that, in embodiments disclosed herein, not all of the various entities depicted in topology 500 are necessary, or even desired, and that certain of the functionality described with respect to the entities depicted in topology 500 may be combined into a single entity or eliminated altogether. Additionally, in some embodiments other data sources not shown in topology 500 may be utilized. Topology 500 is therefore exemplary only and should in no way be taken as imposing any limitations on embodiments disclosed herein.

Figure 6:
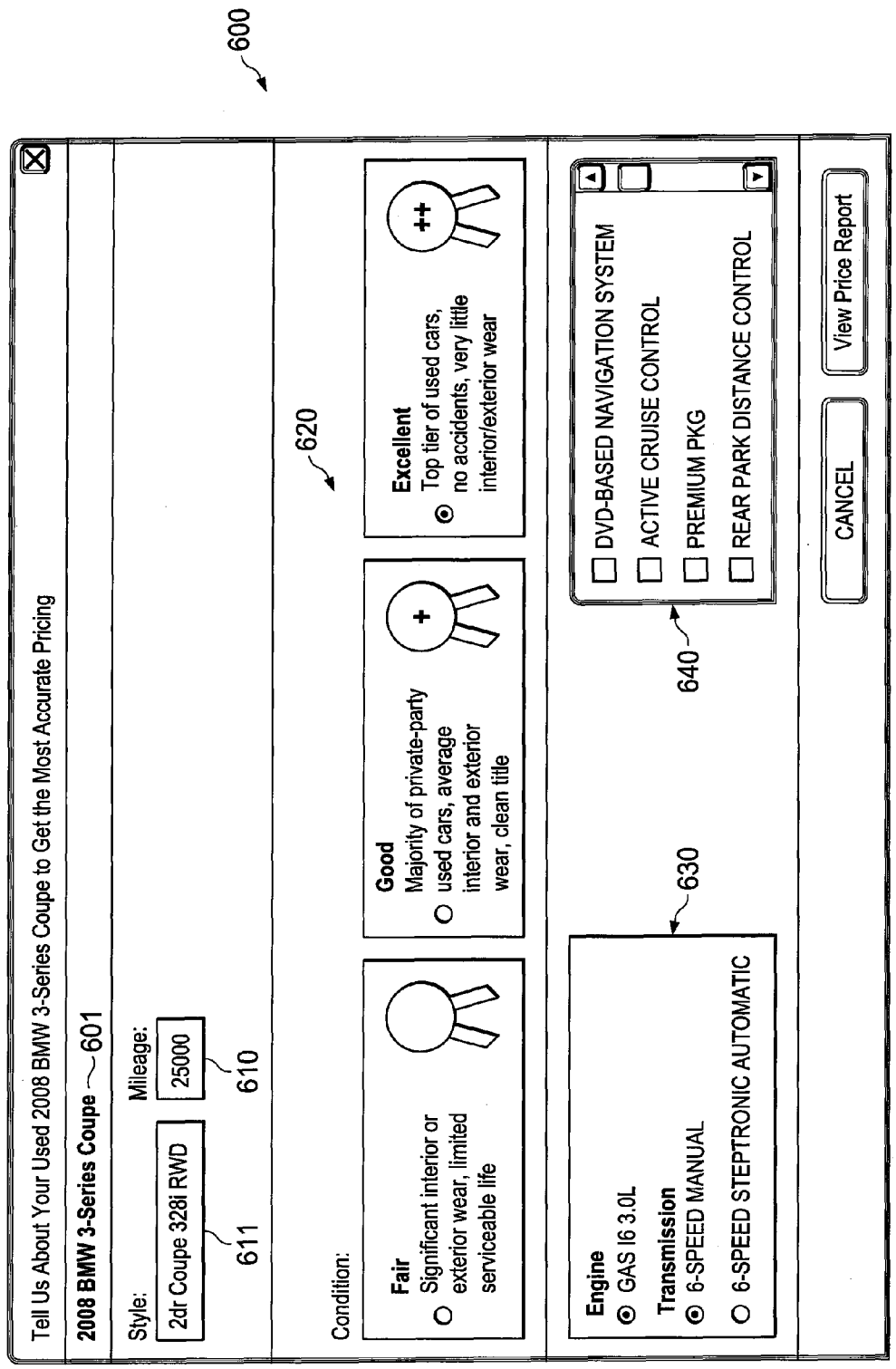
FIG. 6 depicts an example of a graphical user interface that may be displayed on the front end with manufacturer-defined vehicle options.

As discussed above, an NLP system implementing the NLP methodology disclosed herein may be configured to map manufacturer-defined vehicle options to trade-in residuals of those options. FIG. 6 depicts an example of a graphical user interface that may be displayed on the front end with manufacturer-defined vehicle options. Referring to FIG. 5, a user may direct a browser application running on any client device 510 to access a website implementing an embodiment of vehicle data system 520. In response, interface module 592 of vehicle data application 590 may cause page 600 to display on client device 510, utilizing automotive data provided by the user about a particular vehicle and including possible options that the vehicle may have.

As discussed about, general definition of the vehicle year, make, and model are standard. Thus, page 600 can be prepared, at least in part, using the vehicle year, make, and model selected or otherwise provided by the user. In the example of page 600, vehicle 601 is a 2008 BMW 3-Series Coupe. To get the most accurate pricing information on vehicle 601, page 600 may be configured with one or more sections including input 610, condition 620, manufacturer-defined vehicle options 630, and accessories 640. Input 610 may allow the user to fill in additional information such as style, mileage, and so on for vehicle 601. Condition 620 may allow the user to indicate vehicle 601 as being in fair, good, or excellent condition. Manufacturer-defined vehicle options 630 may allow the user to select any manufacturer-defined vehicle options that vehicle 601 may have. Accessories 640 may allow the user to select certain accessories or optional packages that vehicle 601 may have.

In one embodiment, page 600 may be configured utilizing a vehicle option configuration tool known as the Chrome® configurator. Chrome® is a registered trademark of Chrome Systems, Inc. For example, options 630 and accessories 640 may be configured according to the Chrome® definition utilizing the Chrome® configurator. Information presented to the user via page 600 may change dynamically in real time to reflect the specifics of the vehicle at issue. For example, as soon as the user selects a particular model, options 630 and accessories 640 may present selections that are available to that particular model. As soon as the trim information is made available to the underlying system, options 630 and accessories 640 may present selections that are only available to that particular trim.

When a vehicle is sold as new, the sale price may be greatly influenced by the Manufacturer's Suggested Retail Price (MSRP). The MSRP has less influence on vehicles that are not sold as new and the sale price may vary greatly from vehicle to vehicle, depending upon a plurality of factors. Condition 620, manufacturer-defined vehicle options 630, and accessories 640 may all play a part in determining the overall sale price for a vehicle that is not sold as new. Because each dealership may rely on their own (internal and/or external) pricing data with respect to the residual values of manufacturer-defined vehicle options, it is not uncommon for different dealerships to have different sale prices for the same year, make, and model of a vehicle with the same or similar style, mileage, and options. To complicate the matter, vehicles that are not sold as new may be priced and/or offered for sale by private individual sellers. Thus, in addition to dealers, private sellers may list for sale the same year, make, and model of a vehicle with the same or similar style, mileage, and options and yet ask for different sale prices hundreds if not thousands of dollars apart. These previously owned vehicles may or may not have been traded in before, so it may not be clear as to what their true trade-in values may be.

Currently, there exist data providers that keep track of trade-in values of vehicles. Examples of such data providers include Black Book®. Black Book® is a registered trademark of Hearst Business Media Corporation. Additionally, web-based vehicle valuation tools are available to provide vehicle pricing and valuation data. Examples of such web-based vehicle valuation tools include ClearBook®. ClearBook® is a registered trademark of Truecar, Inc. At the back end, various automotive data providers and valuation tools may not utilize the same naming conventions for the same style/trim and/or option and may have no way of mapping them to manufacturer-defined vehicle options, making it extremely challenging to determine the trade-in residuals or values of those options. This challenge can be even more daunting when a vehicle at issue is not associated with any previous trade-in transactions.

Figure 7:
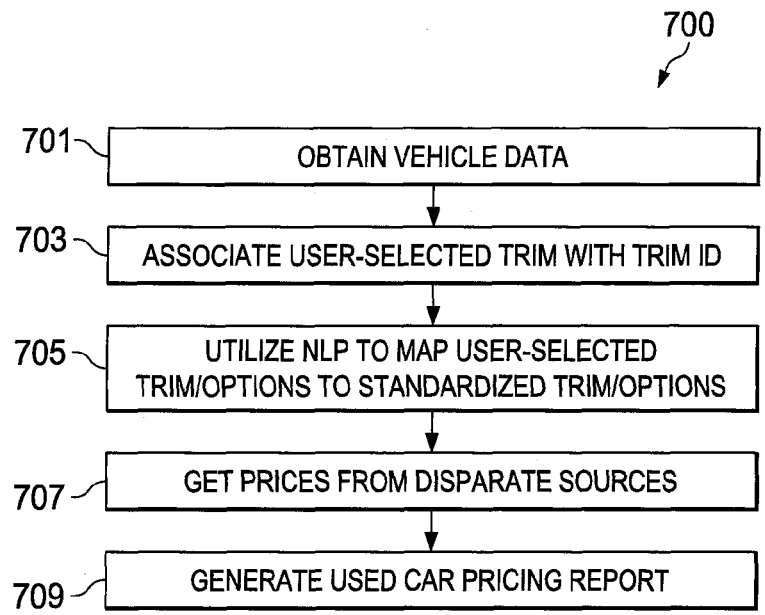
FIG. 7 depicts a flow diagram illustrating an example of one embodiment of a method of associating various pieces of information for generating a used car pricing report for a particular vehicle.

FIG. 7 depicts a flow diagram illustrating an example of one embodiment of a method of associating various pieces of information for generating a used car pricing report for a particular vehicle. One embodiment of system 520 may be configured to implement method 700. Following the example shown in FIG. 6, system 520 may operate to analyze input string 611 to obtain vehicle data 810 (see FIG. 8), including the year, make, model, and trim of vehicle 601 (step 701). The system may assign a trim identifier for the user selected trim 'RWD' (step 703). In one embodiment, the trim identifier may be associated with a set of available options according to the Chrome definition discussed above. The system may utilize the trim identifier to fetch a set of options from vehicle options 850 and present them in real time to the user via page 600. In one embodiment, vehicle options 850 may be stored in data store 522. In one embodiment, vehicle data 810 may be stored in a memory by a process or control logic at the front end until a session between client device 510 and vehicle data system 520 is severed.

Figure 8:
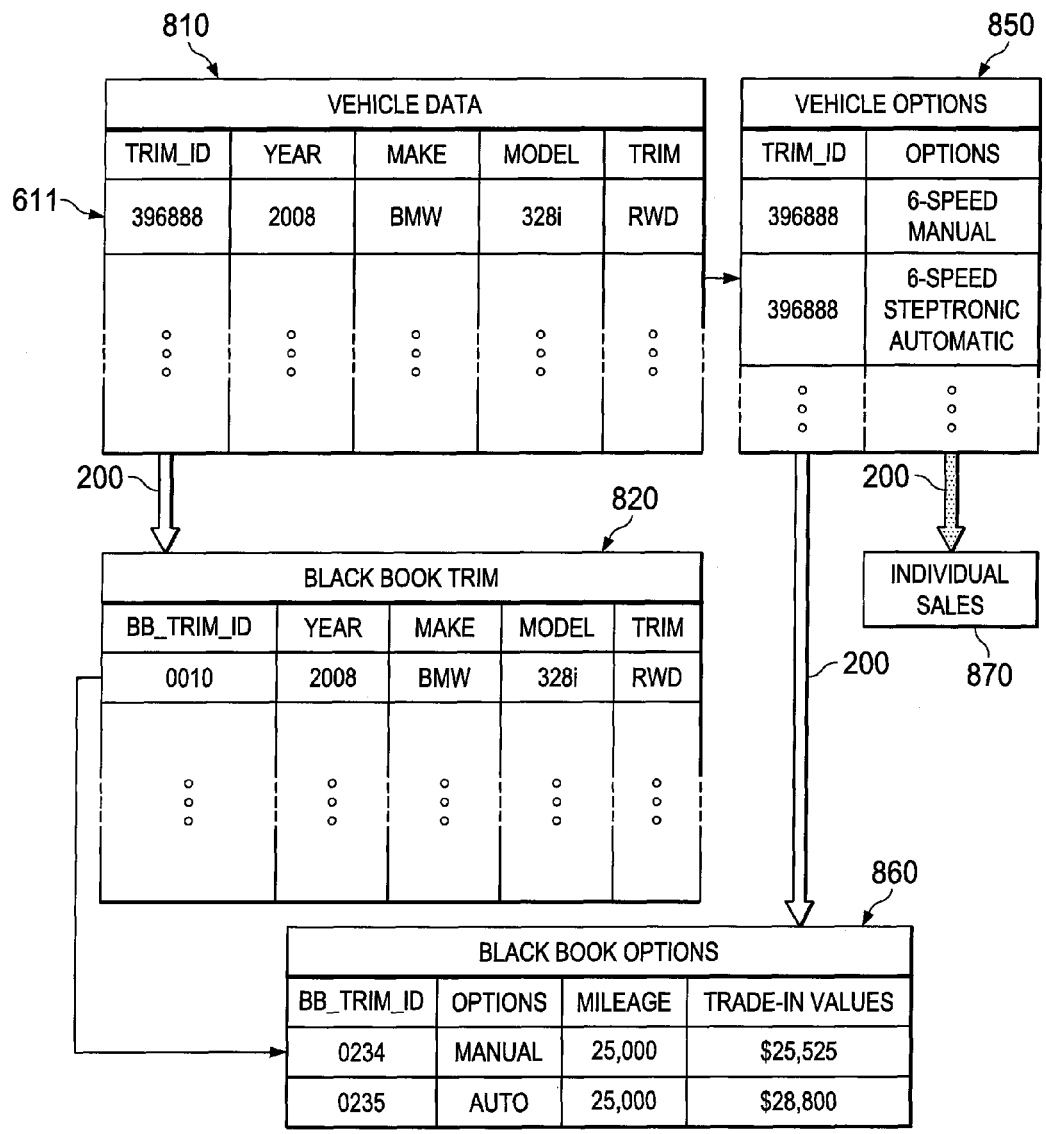
FIG. 8 depicts by example how automotive data from disparate sources can be associated utilizing one embodiment of a NLP system disclosed herein.

The system then utilizes an embodiment of an NLP system disclosed herein to map the user-selected trim and options of a particular vehicle to a standardized trim and options from various sources (step 705). Those skilled in the art will appreciate that this step can be implemented in various ways. For example, 'RWD' from vehicle data 810 may represent a source string. As another example, '2dr Coupe 328i RWD' from input string 611 may represent a source string. As yet another example, '6-Speed Manual' from vehicle options 850 may represent a source string. Depending upon implementation, the source string can then be mapped to a target string in a standardized dataset. In the example of FIG. 8, black book trim 820 may represent a standardized dataset, while black book options 860 may represent another standardized dataset. If the source string can be mapped to a target string, the corresponding prices, including trade-in, sale, and list prices, associated with the target string is then retrieved from disparate sources (step 707) and utilized to generate a used car pricing report for the particular vehicle, trim, and options as indicated by the user (step 709).

In one embodiment, the NLP mapping (step 705) may be performed off-line. In this case, vehicle data 810 may comprise a vehicle database persisted at the back end on data store 522. The vehicle database may contain any and all possible trims according to the Chrome definition. Utilizing the NLP mapping methodology described above, each year, make, model, and trim (as identified by a trim identifier) in the vehicle database can be mapped, with a certain level of confidence, to a corresponding year, make, model, and trim in a database from a data provider. In the example of FIG. 8, NLP system 200 may map each Trim_ID in vehicle data 810 to a BB_Trim_ID in black book trim 820 separate and independent of user interactions with page 600. In this way, at the back-end, each one of the options would already be associated with a residual value as indicated in a standardized dataset. For example, the system now has the knowledge that 'DVD-Based Navigation System' is called 'Navigation System' in the data from a certain trade-in residual data provider. As discussed above, the NLP system can identify that 'DVD-Based Navigation System' can be called 'Navigation System' and can identify the match with 100% confidence. From there, the residual value associated with 'Navigation System' from the trade-in residual data provider can be used for 'DVD-Based Navigation System' in generating a used car pricing report on a vehicle identified by the user as having a 'DVD-Based Navigation System'.

In one embodiment, a hybrid approach may be utilized. The NLP mapping may be performed off-line to map information from known providers as well as in real time (on-the-fly) to aggregate additional information relating to the same year, make, model, and trim/options from individual sales 870. Data on individual sales 870 may come from one or more data providers or sources and may include the list price and/or the sale price. One example of such a data provider may be a data aggregator that collects information from individual sales ads, listings, auctions, etc. Another example of a data provider may comprise a web crawler or netbot programmed to collect online sales ads, listings, auctions, etc. across the World Wide Web.

These data providers may employ naming conventions that are different from each other and/or that are different from what is used in vehicle data system 520. In some embodiments, vehicle data system 520 may comprise NLP system 200. In one embodiment, NLP system 200 may operate to map a source string from each of the one or more sources to a target string in vehicle data 810. In this case, vehicle data 810 represents a standardized dataset. Again, many implementations are possible. For example, only individual sales occurred with a configurable miles radius of a particular user-selected or user-specified locale or zip code or geographical boundary may be provided to NLP system 200 for mapping. Various policies, conditions, and/or parameters may be preconfigured as part of an embodiment of vehicle data system 520. Any used car pricing report thus generated by vehicle data system 520 may reflect these preconfigured policies, conditions, and/or parameters.

Figure 9:
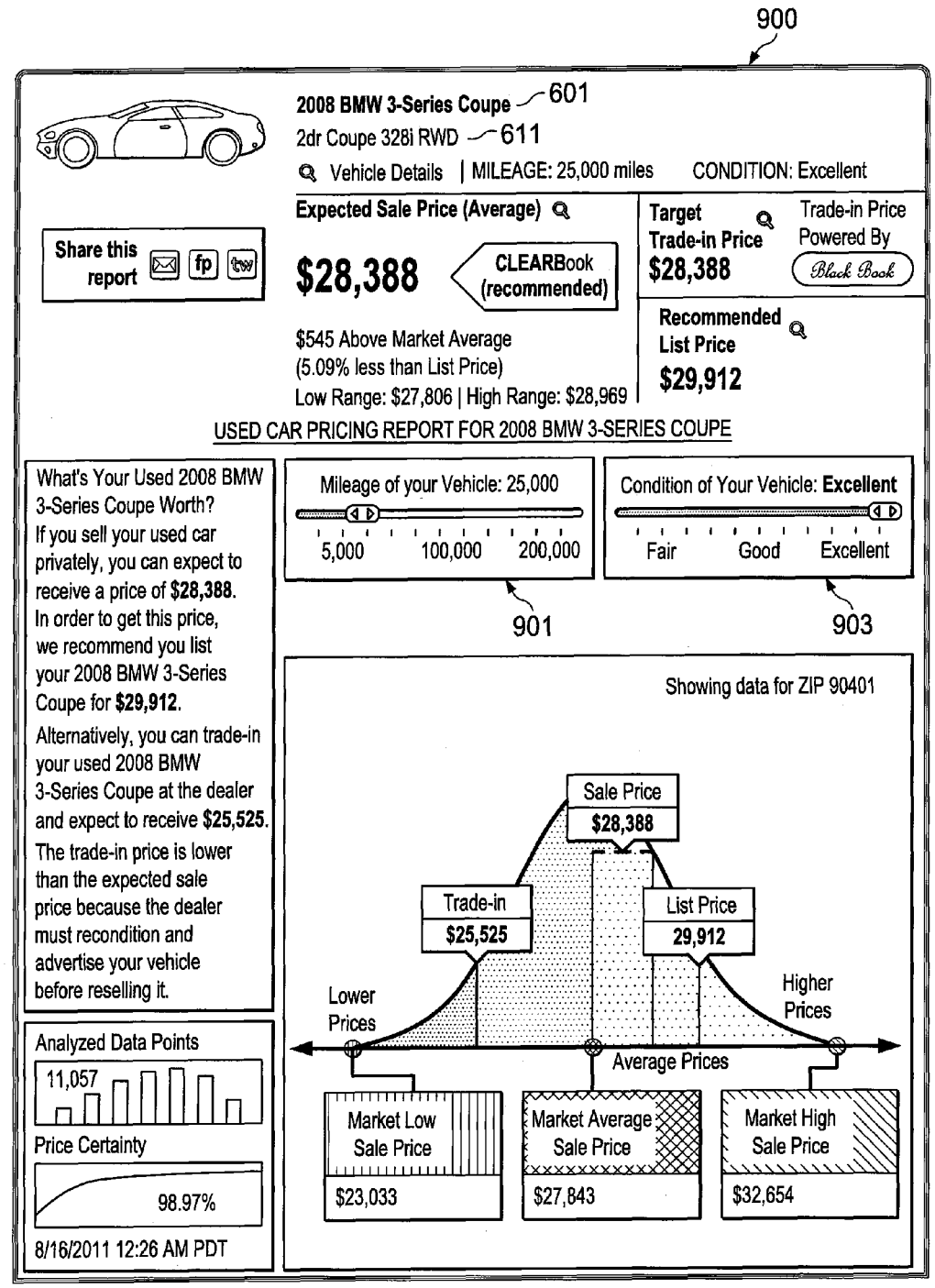
FIG. 9 depicts an example of a used car pricing report generated utilizing one example embodiment of a NLP data mapping system disclosed herein.

FIG. 9 depicts an example of a used car pricing report generated utilizing one example embodiment of a NLP data mapping system disclosed herein. As a non-limiting example, referring to FIG. 6, suppose the user wishes to obtain a pricing report on vehicle 601 with user-selected trim 611, the user may indicate, via various sections on page 600 that vehicle 601 has about 25000 miles and is in excellent condition. In some embodiments, page 600 may be configured to allow the user to enter the style and/or the actual mileage via input 610. The NLP methodology described herein can contribute to the robustness of vehicle data system 520 in cases where a typographical error in a source string manually entered by the user may still be mapped to a target string. This is due, at least in part, to the Levenshtein distance discussed above. For example, if the user accidentally types in 'cupe' instead of 'coupe', the Levenshtein distance is one, which means it only takes a single step of inserting an 'o' to transform the source string into the target string. In one embodiment, instead of allowing the user to manually type in the information, the user may be provided with a list of possible choices to choose from. For example, vehicle data system 520 may provide, via input 610, a list of possible mileages in 500-mile increment, including 24500 miles, 25000 miles, 25500 miles, and so on. Assume the actual mileage is 25150, the user may choose 25000 from the list since 25150 is closer to 25000 than 25500.

In this example, used car pricing report 900 reflects a configurable setting in which only data in a user-selected zip code (in this case '90401') is shown. This setting may be one of a plurality of features configurable by an administrator of vehicle data system 520. In one embodiment, used car pricing report 900 may utilize market data not limited to the user-selected zip code.

In some embodiments, used car pricing report 900 may comprise one or more interactive features through which the user can adjust user-selected automotive data to obtain corresponding pricing information. For example, used car pricing report 900 may initially show what the user can expect to receive for vehicle 601 with 25000 miles and user-selected trim 611 in fair condition. To test what condition(s) may affect prices, used car pricing report 900 may comprise sliding bars or sliders 901, 903 to allow the user to adjust the mileage as well as the condition of the vehicle and see the prices corresponding to the changed mileage and/or condition being displayed on-the-fly in used car pricing report 900. In the example of FIG. 9, in response to the user setting the condition to 'excellent' via slider 903, used car pricing report 900 may dynamically show that vehicle 601 with 25000 miles and user-selected trim 611 in excellent condition can expect to receive a trade-in value of $25,525 at a dealer or a sale price of $28,388 if listed for sale at $29,912. Suppose in order to make vehicle 601 in excellent condition a repair is needed that likely will cost $2000. Used car pricing report 900 may show that the corresponding trade-in value may increase by $500 while the sale price may increase by $2500. In this way, used car pricing report 900 may help the user to decide whether it is worth the effort to take certain actions in selling vehicle 601.

Used car pricing report 900 may be visualized in many ways. For example, although in FIG. 9 a range of sale prices (from low $27,806 to high $28,969) is shown over a bell curve of market sale prices, one embodiment of used car pricing report 900 may be visualized to show only the average sale price of $28,388. Likewise, although in FIG. 9 only the average list price of $29,912 is shown over the bell curve, one embodiment of used car pricing report 900 may be visualized to show a range of list prices. Again, these prices can be from actual data collected or otherwise aggregated by various data providers. Even though these data providers may apply different naming conventions to their data, NLP system 200 can operate to map a vehicle of a particular trim to the most likely trade-in, sale, and list prices and can identify the match with 100% or close to 100% confidence.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as standalone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for mapping automotive data, comprising:
    at a server computer implementing a natural language processing system, determining whether a source string is present in a target string, wherein the source string and the target string represent text strings each comprising a sequence of characters that identify a vehicle characteristic, wherein the source string is from a first source communicatively connected to the server computer over a first network connection, wherein the target string is from a second source communicatively connected to the server computer over a second network connection, and wherein the first source and the second source employ different naming conventions for automotive data collected thereby;
    if the source string is present in the target string, outputting a match containing the source string and the target string; and
    if the source string is not present in the target string, computing a similarity factor based at least on a first set of parameters, wherein the first set of parameters comprises a Levenshtein edit distance parameter based on a comparison of characters in the source string and the target string, a single-word matches parameter based on a comparison of words in the source string and the target string, and a multi-word matches parameter based on a comparison of successive words in the source string and the target string, the similarity factor representing a measure of similarity between the source string and the target string;
    wherein the step of determining whether the source string is present in the target string further comprises:
        determining if an automotive base term that matches the source string is present in an automotive lexicon;
        utilizing the automotive base term to create a set of strings that includes one or more terms in the automotive lexicon; and
        comparing each string in the set of strings with the target string;
    utilizing the match to find from the first source, the second source, or both, pricing information associated with multiple vehicles having a user-selected trim;
    wherein the pricing information comprises at least one trade-in price, at least one sale price, at least one list price, or a combination thereof;
    wherein utilizing the match to find pricing information associated with the vehicles having the user-selected trim comprises aggregating sales information from the first and second sources according to the source string, and determining a value of the vehicles having the user-selected trim based on the aggregated sales information;
    wherein at least a portion of the sales information is aggregated in real time in response to a user selecting the vehicles having the user-selected trim; and
    wherein the determined value of the vehicles having the user-selected trim is presented to the user and is dynamically updated to reflect at least the portion of the sales information aggregated in real time.

2. The method of claim 1, wherein none of the strings in the set of strings is present in the target string, wherein the target string is one of a set of target strings from the second source, and wherein the similarity factor is computed for each string in the set of strings relative to each string of the set of target strings.

3. The method of claim 1, wherein the target string is one of a set of target strings from the second source and wherein the similarity factor is computed for the source string relative to each string of the set of target strings to thereby generate a set of similarity factors, each representing a measure of similarity between two strings, further comprising:
   selecting a pair of strings for output based on the measure of similarity represented by a corresponding similarity factor.

4. The method of claim 1, further comprising:
   comparing the similarity factor with a predetermined threshold; and
   if the similarity factor is greater than or equal to the predetermined threshold, adding the source string to the automotive lexicon.

5. The method of claim 1, wherein the Levenshtein edit distance parameter is computed by:
   determining a Levenshtein distance between the source string and the target string;
   normalizing the Levenshtein distance; and
   taking an inverse of the normalized Levenshtein edit distance.

6. The method of claim 1, wherein the single-word matches parameter is computed by:
   dividing a number of single words present in both the source string and the target string by a total number of words in the target string.

7. The method of claim 1, wherein the multi-word matches parameter is computed by:
   a) reading the source string two consecutive words at a time;
   b) if a word combination of the two consecutive words is present in the target string, increasing a value of the multi-word matches parameter by one;
   c) repeating steps a) and b) until all words in the source string have been read; and
   d) dividing the value of the multi-word matches parameter by a total number of words in the target string.

8. A computer program product comprising at least one non-transitory computer readable medium storing instructions translatable by a server computer implementing a natural language processing system to perform:
   determining whether a source string is present in a target string, wherein the source string and the target string represent text strings each comprising a sequence of characters that identify a vehicle characteristic, wherein the source string is from a first source communicatively connected to the server computer over a first network connection, wherein the target string is from a second source communicatively connected to the server computer over a second network connection, and wherein the first source and the second source employ different naming conventions for automotive data collected thereby;
   if the source string is present in the target string, outputting a match containing the source string and the target string; and
   if the source string is not present in the target string, computing a similarity factor based at least on a first set of parameters, wherein the first set of parameters comprises a Levenshtein edit distance parameter based on a comparison of characters in the source string and the target string, a single-word matches parameter based on a comparison of words in the source string and the target string, and a multi-word matches parameter based on a comparison of successive words in the source string and the target string, the similarity factor representing a measure of similarity between the source string and the target string;
   wherein the step of determining whether the source string is present in the target string further comprises:
      determining if an automotive base term that matches the source string is present in an automotive lexicon;
      utilizing the automotive base term to create a set of strings that includes one or more terms in the automotive lexicon; and
      comparing each string in the set of strings with the target string; and
   utilizing the match or the output to find from the first source, the second source, or both pricing information associated with multiple vehicles having a user-selected trim;
   wherein the pricing information comprises at least one trade-in price, at least one sale price, at least one list price, or a combination thereof;
   wherein utilizing the match to find pricing information associated with the vehicles having the user-selected trim comprises aggregating sales information from the first and second sources according to the source string, and determining a value of the vehicles having the user-selected trim based on the aggregated sales information;
   wherein at least a portion of the sales information is aggregated in real time in response to a user selecting the vehicles having the user-selected trim; and
   wherein the determined value of the vehicles having the user-selected trim is presented to the user and is dynamically updated to reflect at least the portion of the sales information aggregated in real time.

9. The computer program product of claim 8, wherein none of the strings in the set of strings is present in the target string, wherein the target string is one of a set of target strings from the second source, and wherein the similarity factor is computed for each string in the set of strings relative to each string of the set of target strings.

10. The computer program product of claim 8, wherein the target string is one of a set of target strings from the second source, wherein the similarity factor is computed for the source string relative to each string of the set of target strings to thereby generate a set of similarity factors, each representing a measure of similarity between two strings, and wherein the instructions are further translatable by the server computer to perform:
   selecting a pair of strings for output based on the measure of similarity represented by a corresponding similarity factor.

11. The computer program product of claim 8, wherein the instructions are further translatable by the server computer to perform:
   comparing the similarity factor with a predetermined threshold; and
   if the similarity factor is greater than or equal to the predetermined threshold, automatically updating the automotive lexicon to add the source string.

12. The computer program product of claim 8 wherein the Levenshtein edit distance parameter is computed by:
   determining a Levenshtein distance between the source string and the target string;
   normalizing the Levenshtein distance; and
   taking an inverse of the normalized Levenshtein edit distance.

13. The computer program product of claim 8, wherein the single-word matches parameter is computed by:
dividing a number of single words present in both the source string and the target string by a total number of words in the target string.

14. The computer program product of claim 8, wherein the multi-word matches parameter is computed by:
a) reading the source string two consecutive words at a time;
b) if a word combination of the two consecutive words is present in the target string, increasing a value of the multi-word matches parameter by one;
c) repeating steps a) and b) until all words in the source string have been read; and
d) dividing the value of the multi-word matches parameter by a total number of words in the target string.

15. The method of claim 1, further comprising creating a mapping from each string in a standardized dataset to corresponding strings in each of the first and second sources, wherein each string represents a vehicle trim or option.

16. The method of claim 1, further comprising, if the automotive base term is not present in the automotive lexicon, adding the automotive base term to the automotive lexicon.

17. The computer program product of claim 8, wherein the instructions are further translatable by the server computer to perform:
creating a mapping from each string in a standardized dataset to corresponding strings in each of the first and second sources, wherein each string represents a vehicle trim or option.

18. The computer program product of claim 8, wherein the instructions are further translatable by the server computer to perform:
if the automotive base term is not present in the automotive lexicon, adding the automotive base term to the automotive lexicon.

\* \* \* \* \*